US005829760A

United States Patent [19]

Mistrater et al.

[11] Patent Number: 5,829,760

[45] Date of Patent: Nov. 3, 1998

[54] CHUCK ASSEMBLY WITH A RADIAL SPRING

[75] Inventors: Alan B. Mistrater; Stanley J. Pietrzykowski, Jr., both of Rochester, N.Y.; Alfred O. Klein, St. Louis, Mo.; Loren E. Hendrix, Webster; Mark C. Petropoulos, Ontario, both of N.Y.

[73] Assignee: Xerox Corporation, Stamford, Conn.

[21] Appl. No.: 829,738

[22] Filed: Mar. 31, 1997

[51] Int. Cl.[6] ................................ B66C 1/44; B66C 1/56; B23B 31/40

[52] U.S. Cl. .......................... 279/2.22; 269/47; 279/2.21; 294/93; 403/372

[58] Field of Search ................................. 279/2.01, 2.21, 279/2.22, 102; 294/93; 403/372; 269/47, 48.1

[56] References Cited

U.S. PATENT DOCUMENTS

| | | | |
|---|---|---|---|
| 1,267,146 | 5/1918 | Tripp | 279/102 |
| 5,282,888 | 2/1994 | Fukawa et al. | 118/500 |
| 5,320,364 | 6/1994 | Mistrater et al. | 279/2.17 |
| 5,322,300 | 6/1994 | Mistrater et al. | 279/2.17 |
| 5,324,049 | 6/1994 | Mistrater et al. | 279/2.17 |
| 5,328,181 | 7/1994 | Mistrater et al. | 279/2.17 |

OTHER PUBLICATIONS

Edward J. Grief, "A Quick–Acting Mandrel", in American Machinist, May 7, 1925, p. 747.

*Primary Examiner*—Steven C. Bishop
*Attorney, Agent, or Firm*—Zosan S. Soong

[57] ABSTRACT

There is disclosed a chuck assembly for internally holding a hollow substrate having an open end including: (a) a body including an end section having a width narrower than that of the inner width of the substrate to permit insertion of the end section through the substrate open end into the substrate interior; and (b) a compressible spring coiled around a portion of the end section, wherein prior to compression the spring has an outer width larger than that of the inner width of the substrate, wherein upon insertion of the end section of the body into the substrate the spring is compressed by contact with the substrate inner surface resulting in the chuck assembly holding the substrate by the force generated against the substrate inner surface by the spring in opposition to the compression.

10 Claims, 2 Drawing Sheets

16

2

4

20

14

6

12

8

10

CHUCK ASSEMBLY WITH A RADIAL SPRING

FIELD OF THE INVENTION

This invention relates to a simple, low cost chuck assembly for internally holding a substrate such as a drum or a belt for processing.

BACKGROUND OF THE INVENTION

Conventional chuck assemblies are illustrated in Fukawa et al., U.S. Pat. No. 5,282,888; Mistrater et al., U.S. Pat. No. 5,322,300; Mistrater et al., U.S. Pat. No. 5,328,181; Mistrater et al., U.S. Pat. No. 5,320,364; and Mistrater et al., U.S. Pat. No. 5,324,049. There is still a need, which the present invention addresses, for a chuck assembly that is simpler than those described above with no moving parts to reduce costs.

SUMMARY OF THE INVENTION

The present invention is accomplished in embodiments by providing a chuck assembly for internally holding a hollow substrate having an open end comprising:

(a) a body including an end section having a width narrower than that of the inner width of the substrate to permit insertion of the end section through the substrate open end into the substrate interior; and (b) a compressible spring coiled around a portion of the end section, wherein prior to compression the spring has an outer width larger than that of the inner width of the substrate, wherein upon insertion of the end section of the body into the substrate the spring is compressed by contact with the substrate inner surface resulting in the chuck assembly holding the substrate by the force generated against the substrate inner surface by the spring in opposition to the compression.

BRIEF DESCRIPTION OF THE DRAWINGS

Other aspects of the present invention will become apparent as the following description proceeds and upon reference to the Figures which represent preferred embodiments.

Unless otherwise noted, the same reference numeral in different Figures refers to the same or similar feature.

DETAILED DESCRIPTION

Figure 1:
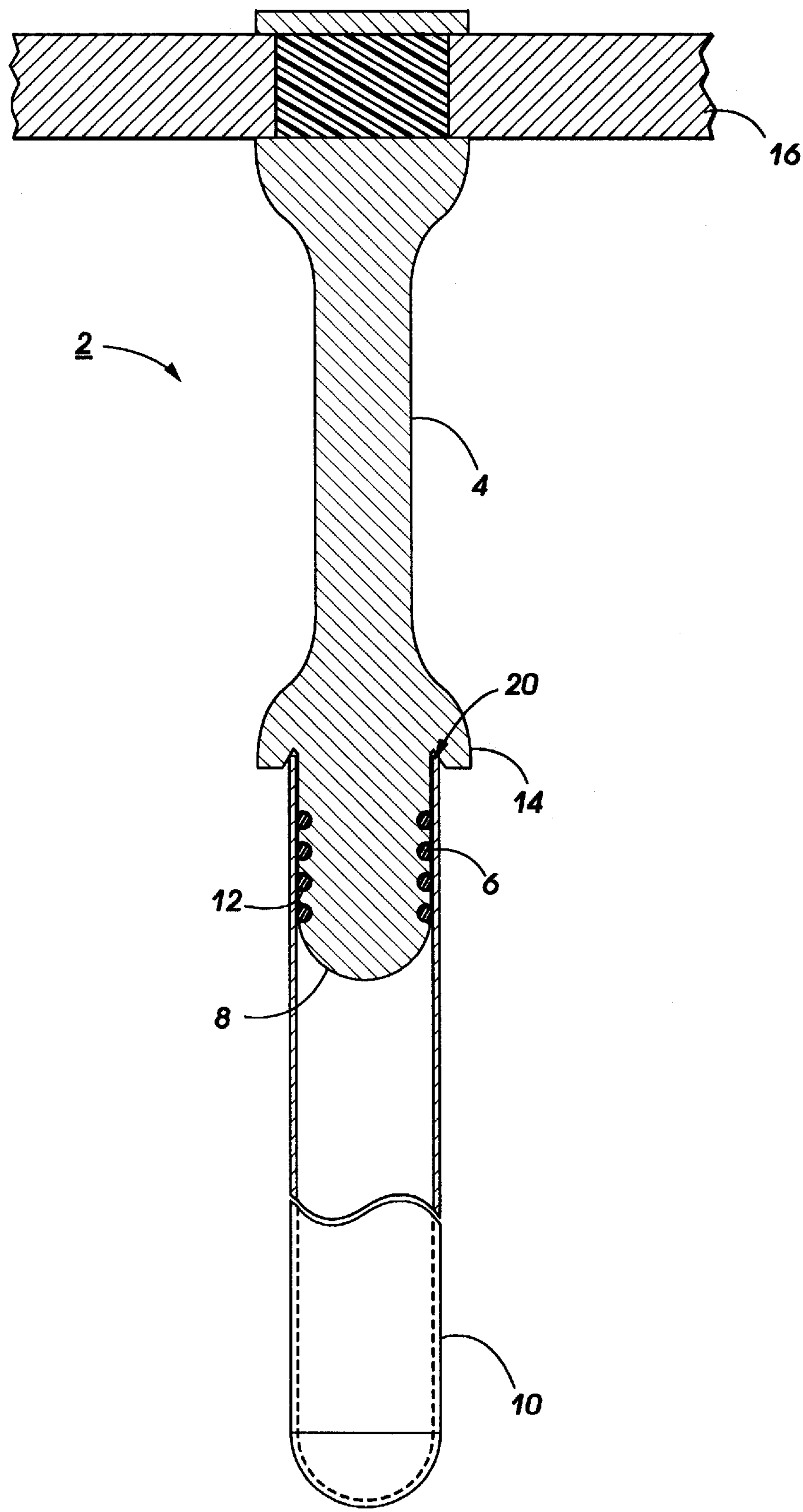
FIG. 1 represents a side cross-sectional view of one embodiment of the present chuck assembly.

FIG. 1 illustrates a chuck assembly 2 including a generally cylindrically shaped body 4 and a spring 6. The body 4 has an end section 8 having a width narrower than that of the inner width of the substrate 10. The end section 8 preferably has a cylindrical shape and optionally defines a groove 12 encircling the end section to receive the spring. The groove 12 may have a depth ranging for example from about 0.5 mm to about 10 mm. The body 4 may be formed of two or more pieces joined together, but preferably is a single piece. A flared region 14 on the body may be present to position the open end 20 of the substrate on the body 4. The body may be fabricated from a metal like steel or aluminum or a plastic such as TEFLON™. The other end of the body is coupled to a pallet 16, which can hold a plurality of chuck assemblies ranging in number from 2 to 400 (not shown).

The spring 6 is a radial spring that coils around the outer surface of a portion of the end section. The phrase radial spring indicates that the spring is circumferential, i.e, it resides on the circumference of the body 4 such as at end section 8. The spring collapses or is compressed in the direction of the radius line of the end section 8. To provide a snug fit with the end section 8, the spring 6 may have an inner width (distance between opposite inner surfaces of a coil) slightly smaller than the width of the end section such as about 2% to about 10% smaller. In those embodiments where the spring 6 is disposed in the groove 12, the reduction in end section width caused by the presence of the groove should be taken into account when determining the spring inner width. To position the spring, the spring is pulled onto the end section into the groove, where each coil of the spring is disposed in one circumferential groove, with the number of grooves matching the number of coils. After placement on the end section, but prior to compression, the spring has an outer width (distance between opposite outer surfaces of a coil) slightly larger than that of the substrate inner width such as about 2% to about 10% larger, even when the spring is disposed in the groove. Prior to compression, the spring 6 may extend beyond the surface of the end section 8, even when the spring is disposed in the groove 12, by a thickness ranging from about 0.5 mm to about 2 mm. The spring has a number of coils ranging from about 5 to about 40, preferably from about 10 to about 20. Although some coils may fail to contact the substrate inner surface, it is preferred that all of the coils contact the substrate inner surface. The spring may be fabricated from any suitable material such as a metal like stainless steel or a plastic such as polypropylene. A durable spring material such as stainless steel is preferred since the substrate end may be rather sharp and repeated contact of the spring with a plurality of substrates may present a wear problem for the spring. The spring may have the following preferred dimensions: an outer width ranging from about 2 mm to about 10 cm, and a thickness of the wire forming each coil ranging from about 0.2 mm to about 2 mm. The number of coils per unit length may range for example from about 5 to about 25 coils/inch. Preferably, only the spring of the chuck assembly contacts the inner surface of the substrate, but a portion of the end section surface may also contact the substrate inner surface.

Preferably, there is absent any movable parts such as a slidable rod within the chuck assembly (the spring is not considered a movable part for purposes of this discussion). The materials of the chuck assembly are selected to withstand the temperature changes, chemicals, and chemical fumes associated with for example a dipcoating process used in the fabrication of photosensitive members.

Operation of the chuck assembly of FIG. 1 proceeds as follows. The pallet 16 moves the chuck assembly 2 over the open end 20 of the substrate 10 and the end section 8 is inserted into the substrate where contact with the substrate inner surface compresses the spring 6 against the end section 8. The end section is inserted until the open end 20 of the substrate is adjacent the flared region 14 of the body. The chuck assembly holds the substrate by the force generated against the substrate inner surface by the spring in opposition to the compression. Preferably, there is no rotation of the chuck assembly during its operation.

Figure 2:
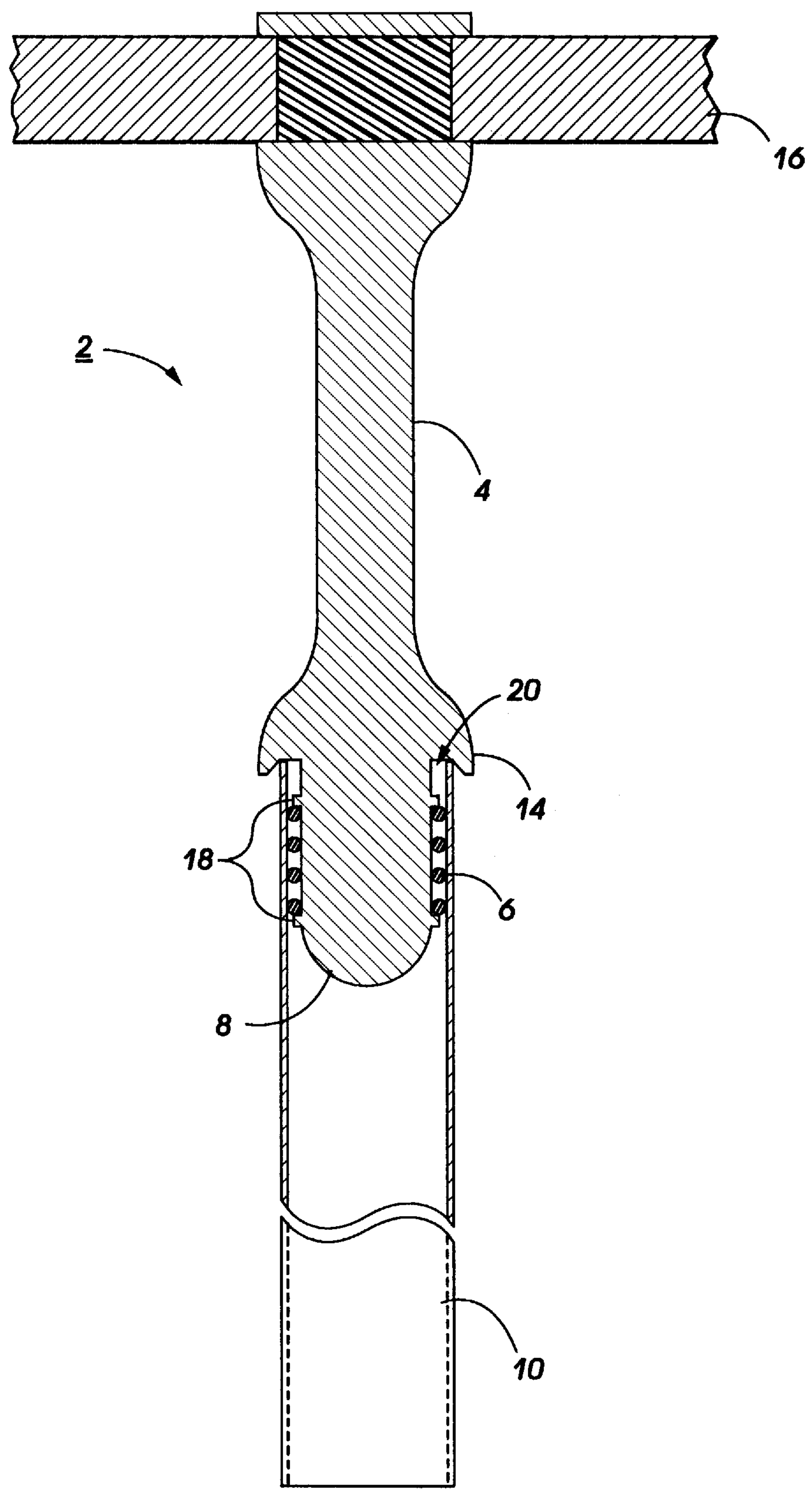
FIG. 2 represents a side cross-sectional view of another embodiment of the present chuck assembly.

FIG. 2 shows another embodiment of the chuck assembly 2 where the groove 12 of FIG. 1 is absent. Circumferential ridges 18 are optionally present above and below the spring 6 to prevent the spring from slipping off the end section 8 during use of the chuck assembly. To prevent the ridges 18 from blocking the insertion of the end section into the substrate 10, the ridges protrude from the surface of the end section at a lower profile than that of the spring. The ridges may extend from the end section surface at a height ranging from about 0.5 mm to about 2 mm. Operation of the chuck assembly 2 of FIG. 2 proceeds in a manner similar to that of FIG. 1.

The present chuck assembly may be employed in the dip coat process material handling system described in Pietrzykowski, Jr. et al., U.S. Pat. No. 5,334,246, the disclosure of which is totally incorporated herein by reference.

The present chuck assembly has one or more of the following characteristics: low mass, simplicity, low cost, and ease of operation. An advantage of the chuck assembly in embodiments is that it embodies low mass and therefore may not cause excessive heat flow from a thin substrate to the chuck assembly when placed in an oven, especially in those embodiments where only the spring contacts the inner surface of the substrate. The present chuck assembly is particularly useful for a substrate with one open end and one closed end (the closed end may result for example from electroforming where the electroformed parabolic shaped end is not removed from the substrate). In certain embodiments, the present chuck assembly can form a hermetic seal (i.e., a fluid-tight seal) with the substrate inner surface through the use for example of an elastic membrane incorporated into the chuck assembly. In other embodiments, the present chuck assembly fails to form a hermetic seal with the substrate inner surface, thereby permitting for example liquid to enter the substrate interior through an open end of the substrate immersed in a solution. Of course, a hermetic seal may not be needed between the chuck assembly and the substrate where the substrate has a closed bottom end since the closed bottom end will prevent liquid from entering the substrate interior.

Any suitable rigid or flexible substrate having for example a drum or belt configuration may be held by the present chuck assembly. The substrate may have a cylindrical cross-sectional shape or a noncylindrical cross-sectional shape such as an oval shape. The substrate may be at least partially hollow, and preferably entirely hollow, with one or both ends being open. In preferred embodiments, the substrate is involved in the fabrication of photoreceptors and may be bare or coated with layers such as photosensitive layers typically found in photoreceptors. The substrate may have any suitable dimensions.

Other modifications of the present invention may occur to those skilled in the art based upon a reading of the present disclosure and these modifications are intended to be included within the scope of the present invention.

I claim:

1. A chuck assembly for internally holding a hollow substrate having an open end comprising:

(a) a body including an end section having a width narrower than that of the inner width of the substrate to permit insertion of the end section through the substrate open end into the substrate interior; and (b) a compressible spring coiled around a portion of the end section, wherein prior to compression the spring has an outer width larger than that of the inner width of the substrate, wherein upon insertion of the end section of the body and the spring into the substrate the spring is compressed by contact with the substrate inner surface resulting in the chuck assembly holding the substrate by the force generated against the substrate inner surface by the spring in opposition to the compression wherein the chuck assembly is nonrotating and engages the substrate without any twisting of the substate onto the end section of the body and the spring.

2. The chuck assembly of claim 1, wherein the body is a single piece.

3. The chuck assembly of claim 1, wherein there is absent a movable part within the chuck assembly.

4. The chuck assembly of claim 1, wherein the body includes a flared region to position the open end of the substrate on the body.

5. The chuck assembly of claim 1, wherein the end section includes a groove and the spring is disposed in the groove.

6. The chuck assembly of claim 1, wherein the end section has a cylindrical shape.

7. The chuck assembly of claim 1, wherein the spring is fabricated from a metal.

8. The chuck assembly of claim 1, wherein the spring has a number of coils ranging from about 5 to about 40.

9. The chuck assembly of claim 1, wherein only the spring of the chuck assembly contacts the inner surface of the substrate.

10. The chuck assembly of claim 1, wherein the chuck assembly internally holds only an end region of the substrate.

* * * * *